United States Patent [19]

Siegwart

[11] 3,996,961
[45] Dec. 14, 1976

[54] FLOW REGULATOR FOR AIR DUCTING

[76] Inventor: Emil Siegwart, Michael-Blatter-Strasse 6, D-6603 Sulzbach-Neuweiler, Germany

[22] Filed: June 26, 1974

[21] Appl. No.: 483,423

[30] Foreign Application Priority Data

July 3, 1973 Germany .......................... 2333694

[52] U.S. Cl. ............................. 137/517; 137/527.8; 251/337; 251/338
[51] Int. Cl.[2] ................... F16K 15/02; F16K 31/12
[58] Field of Search .......... 137/517, 518, 519, 520, 137/524, 527, 527.8, 521, 484.2, 484 A, 494, 499; 251/337, 338, 305, 306, 307, 308; 138/46

[56] References Cited

UNITED STATES PATENTS

| | | | |
|---|---|---|---|
| 386,461 | 7/1888 | Goll | 137/527 |
| 1,082,174 | 12/1913 | Rutherford | 137/519 |
| 1,105,280 | 7/1914 | Kurtz | 137/521 |
| 2,278,421 | 4/1942 | Brown | 251/305 X |
| 2,859,772 | 11/1958 | Weiss | 137/527.8 |
| 3,111,142 | 11/1963 | Acosta | 138/46 |
| 3,187,768 | 6/1965 | Waterfill | 137/521 X |

*Primary Examiner*—William R. Cline
*Attorney, Agent, or Firm*—Larson, Taylor and Hinds

[57] ABSTRACT

A flow regulator for air ducting comprises a flap which can be rotated about a shaft against the action of a spring, by the air current, to regulate air flow therepast. The flap has two portions which are disposed at an obtuse angle to each other about a bend line, one of the portions, in an open condition of the regulator, being directed downstream of the shaft generally parallel to the ducting axis, and is obliquely oriented in the closed condition and the other portion, in a closed condition of the regulator, is disposed in a plane lying at right angles to the ducting axis, and is obliquely oriented in the open condition. The obtuse angle of the flap portions is preferably of the order of 145° to 155°.

15 Claims, 6 Drawing Figures

FLOW REGULATOR FOR AIR DUCTING

FIELD OF THE INVENTION

This invention relates to a flow regulator for air pipes, in which the free pipe cross-section is variable by a flap which is rotatable on a shaft, arranged near a transverse axis, against a spring force, acting on this latter, under the influence of air flow in the closing direction.

DISCUSSION OF THE PRIOR ART

Rotation of the flap by the air flow is achieved in known regulators of this type chiefly by the flap being arranged, by means of rigid connecting arms, at a spacing from its shaft. Because of the oblique position of the flap with regard to the direction of flow, a torque acting in the closure direction arises on account of this spacing.

The path, which is determined by the spacing of the flap from its shaft and on which the flap moves, limits the applicability to only rectangular pipes.

Likewise, only in the case of rectangular cross-section pipes can regulators having double flaps be used which have a common central bearing and are folded apart more or less widely by the air low, against which they are directed, at the same time overcoming a spring force.

In circular pipes the flow could hitherto be controlled simply with the aid of valve bodies which are movable axially onto a valve seat of round cross-section.

All these flow regulators are subject, conditioned by the systems, to the fault that they respond only at relatively substantial pressures (flap and double flap regulators) or higher pressures (regulators for round cross-sections). However, such pressures are very often no longer achieved in remote pipe sections of a network, so that no possibility of regulation is possible in that case.

OBJECT OF THE INVENTION

The invention has as its object the provision of a flow regulator which is capable of working even at fairly low pressures.

BRIEF STATEMENT OF THE INVENTION

In accordance with the invention, there is provided a flow regulator for air ducting in which the free ducting cross-section can be varied by a flap which can be rotated, by air flow in the closing direction, about a shaft arranged near a cross-sectional centre axis against a spring force, wherein the flap is angled near the shaft, one portion being directed downstream of air flow in an open position and its other portion being aligned in the closed position substantially at a right angle to the ducting axis. The said one portion opposes flow in the closed position being obliquely directed downstream, and the other opposes flow in the open position being obliquely directed upstream.

The oblique alignment of the second portion in the open position allows, a sufficient torque for regulation to be exerted on the flap by air flow, even without arrangement of the same (as in the case of the known flap) at a spacing from the shaft, so that it is possible to balance the flap weight in relation to the shaft by light counter-weights which hardly increase the moment of inertia counter-weights which hardly increase the moment of inertia of the flap. Furthermore, the bent flap whose points at which stress is applied will normally lie (i.e. for example in the case of arrangement of the shaft at the fold line of the flap, just as in the case of the known flap) downstream of the shaft, displays, in cntrast to all the known regulators, a flow-stable behaviour which requires no damping of flutter movements. On account of these two facts, the shaft can be mounted comparatively sensitively and its torque remains so extensively free from disturbing influences that fairly weak spring forces can be applied and the flap is thereby capable of working in the lowest pressure regions.

The weight balance of the flap allows, in addition, an arrangement of the regulator at any installation angle whatsoever, the flow stability allows damping members to be dispensed with and, in the case of round pipes, expensive bulky sound-proof housings.

The angling of the flap further increases the regulating accuracy insofar as it prevents flow breaks or stalls and, consequently, hysteresis phenomena: The break-endangered front flap portion always very soon assumes a comparatively obtuse angle of incidence in relation to the flow direction, which angle always remains beyond the break conditions. Finally, the flow regulator in accordance with the invention has, compared with known flap regulators, the considerable advantage of being able to be used on round pipe cross-sections; the slight eccentricity of the flap shaft, by way of example 1 to 4% of the relevant pipe diameter necessary, still does not bring the pipe wall in an obstructing manner into the path of movement space of the flap. The advantage is of exceptional significance insofar as precisely in the case of round pipe cross-sections the lowermost regulating pressure, as already mentioned, in the case of the known regulators is particularly unfavourable.

The two portions of the flap will, as a rule, stand at an angle of 135° to 160°, preferably between 145° to 155° in relation to one another.

Advantageously counter-weights for fastening the flap to the shaft penetrate the flap with an extension which embraces the shaft and which has a screw clamping the shaft and the flap together to the counter-weight.

The open position of the flap can be determined by a stop bolt for one of the flap portions.

Since the flow regulator for achieving a regulating pressure, which is equal upon the various pressures arising, requires a spring force which acts on the flap shaft and which increases non-linearly with flap deflection, such as can be noted in the case of all springs, but which has a curvature of the characteristic curve, it is proposed in accordance with a further feature of the invention that there is provided on the shaft outside the pipe a spring element which has, in different angular positions of the shaft, different kinds of stress which increase the spring force with greater angular rotation.

The different types of stress can, for example, occur in that the spring element consists of two individual springs, preferably spiral springs, one of which is fastened in such a way that it is stressed only from a certain angular rotation of the shaft onwards.

However, it is also possible and, since it is simpler, advantageous to use only one helical spring which is seated on a lever, arranged on the shaft, with slight prestressing in a holder which allows a limited free angular rotation of the spring end in relation to the lever. In this case, upon rotation of the shaft with the lever the spring is stressed initially more along the lines of a leaf spring, and only after a free angular rotation of the spring end is no longer possible is the entire spring drawn-in spirally, and its looping angle or angle of grip increased.

In order to make the limited free angular rotation of the spring end possible, by way of example only the inner spring end having a bend can be seated rotatable in a bore, parallel to the shaft, in the lever and the lever can have a shoulder such that this latter butts, after a predetermined angular rotation of the flap, against the spring end and this latter is thus seized in torsionally-fast manner for the further angular rotation.

The lever can also be formed by a block, seated on the shaft, having a bolt which is fastened thereto and which has a bore, which receives the spring end, of substantially greater diameter than the spring wire.

Finally, it is advantageous, in order to be able to adjust any biasses whatsoever, if the outer spiral spring ends, or the spiral spring end, are or is fastened to a self-locking disc which is rotatable about the shaft of the flap and which expediently forms the base of a flat capsule which encloses the entire spring element.

The invention will be described further, by way of example, with reference to the accompanying drawing, wherein.

Figure 1:
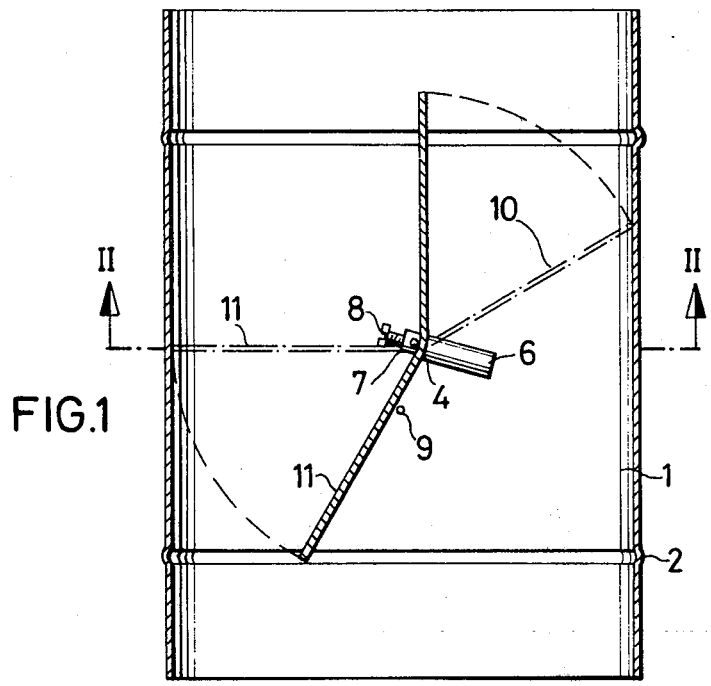
FIG. 1 shows a preferred embodiment of flow regulator for an air duct, conforming to the invention, and in longitudinal section taken on the line I—I of FIG. 2.
Figure 2:
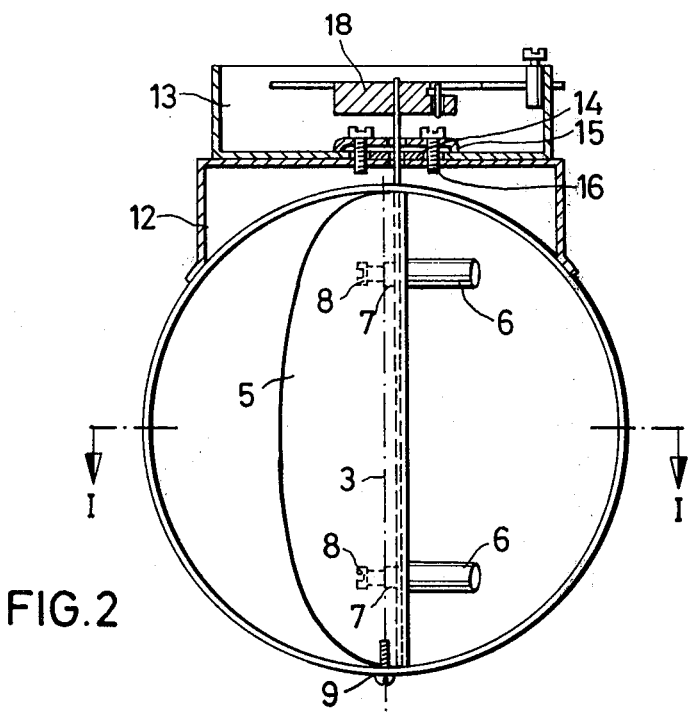
FIG. 2 is a cross-section on the line II—II of FIG. 1.

A prferred embodiment of flow regulator conforming to the invention has a tubular housing 1 having a round cross-section and can be attached to, and locked by means of up to two corrugations 2 into a circular air duct (not shown). At approximately 3% spacing from the cross-sectional centre axis 3, related to the diameter of the housing 1, a shaft 4 is mounted in bores in the housing wall. Seated on the shaft 4 is a flap 5 which is angled centrally in its longitudinal section by about 30°. It is fastened to the shaft 4 in that two cylindrical counter-weights 6, which place the axis of gravity of the flap into the rotary axis of the shaft, are seated with a correspondingly angled offset on the angle edge and penetrate the flap here with an extension 7 which is seated respectively with a bore on the shaft 4 and which has an axial screw 8 which leads into the bore and by means of which the shaft 4 and the flap 5 are clamped together in front of the said offset. In the open position, which is secured by a stop screw 9 projecting into the free cross-section of the tubular housing 1, the one portion 10 of the flap is aligned parallel to the pipe axis downstream of the air flow, and the other portion 11 is aligned obliquely forwardly. In the closed position, shown in dot-dash lines, the portion 11 moves into a cross-sectional plane of the tubular housing, and the portion 10 is directed obliquely downstream. The shaft 4, as FIG. 2 reveals, projects somewhat at the one side of the housing and projects through an adjoint-part 12 into a flap-cylindrical capsule 13 which can be closed outwardly by a lid (not shown). The capsule 13 is rotatable about a centering piece 14 which is seated on the adjoint part 12, but is clamped in self-locking manner by a disc 15 which is fastened, by means of screws 16 penetrating curved slots in the base of the capsule 13, to the shoulder or adjoint part 12.

Figure 3:
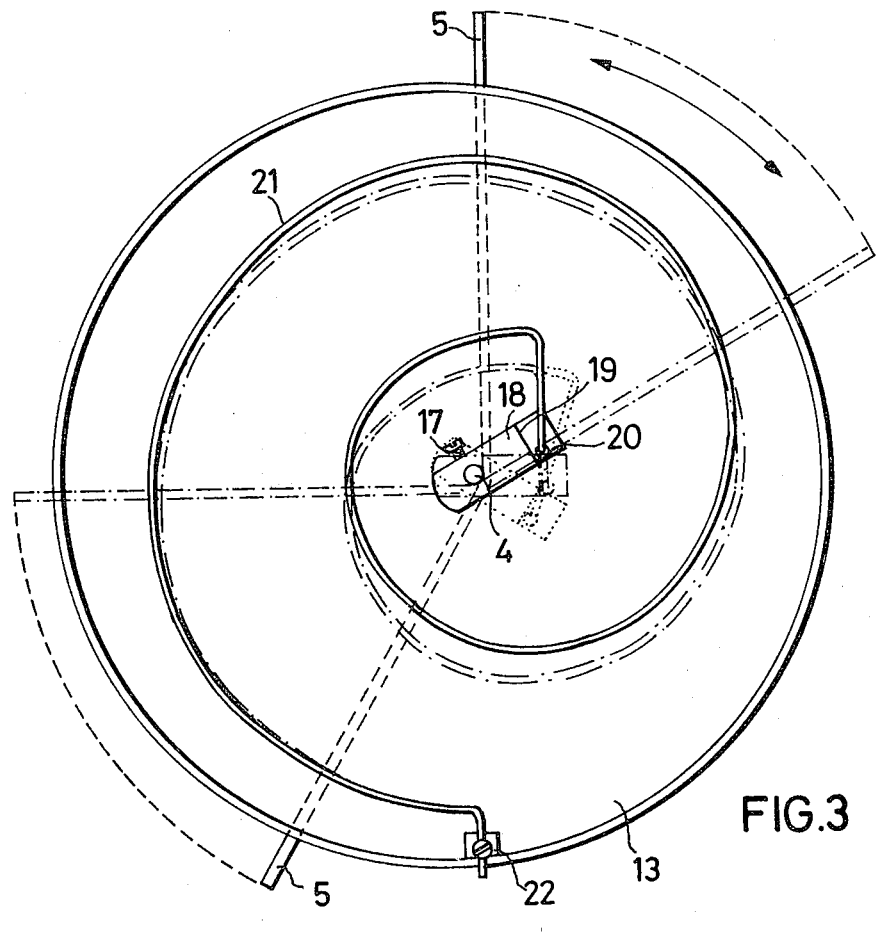
FIG. 3 is an enlarged view of the flow regulator of FIGS. 1 and 2.

In the capsule 13, a lever 18 is fastened on the shaft 4 by means of a screw 17 which is visible in FIG. 3. This lever has, near its end, in an offset forming a shoulder 19, a bore 20 which is parallel to the shaft 4 and in which the inner end of a spiral spring 21 having a bend is rotatably seated, the outer end of which spring is held in a clamping part 22 which is arranged at the edge of the capsule 13.

Figure 4:
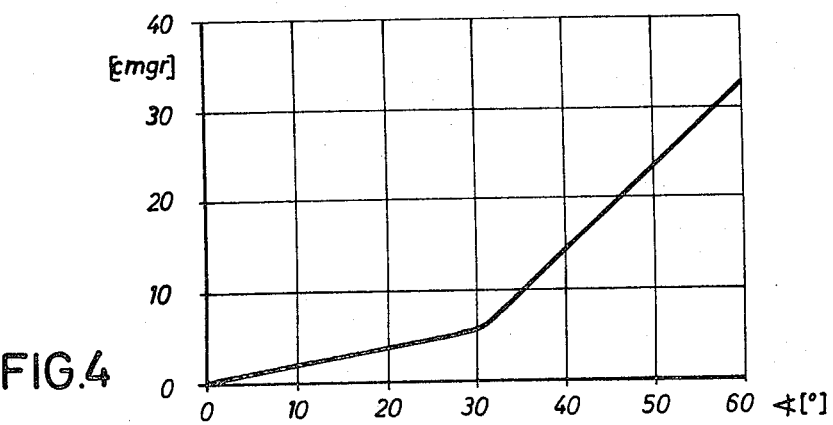
FIG. 4 shows the characteristic curve of a spring element of the regulator, shown in FIG. 3.

The position of the lever 18 and the course of the helical spring 21 are reproduced in FIG. 3 in solid lines for the open position of the flap 5 and in dot-dash lines for the closure position; an intermediate position is shown in dotted lines. If the flap 5 is deflected out of the open position, then the bore 20 moves with the spring end downwards in accordance with FIG. 3. In this connection, the spring is first of all deflected substantially only in leaf spring-like manner; the bending at its end rotates in the bore 20. If, after rotation of approximately 30°, the position shown in dotted lines is reached, then the shoulder 19 is applied against the spring end and terminates therewith the initial rotatability thereof in relation to the lever 18. The spring 21 is now completely drawn-in spirally and is consequently stressed along the lines of a spiral spring. The fairly sharp rise, which sets-in in this case, of the characteristic curve can be seen in the diagram in accordance with FIG. 4 in which the torque is plotted in centimeters/ponds over the rotational angle in degrees. The characteristic curve of the spring element thus has a course which allows, both in the lowest and in the highest pressure regions, the regulation to a desired end pressure. The flow regulator described already responds at very low pressures, and is therefore still functionable in the most remote pipe parts of a network. The pressure loss in this low pressure region is not readily measurable.

By rotation of the capsule 13 with the clamping part 22 for the outer spring end, the flow regulator can be adjusted to various regulation pressures and therefore be adapted to the most varied application.

In the case of the construction of such a regulator, there are possibilities of variation for achieving certain desired properties, by way of example in the length, thickness and elasticity of the spring wire, the arrangement of the shoulder 19 and the extent and the direction in which the spring end having the point of application of force is arranged remote from the shaft 4.

Figure 5:
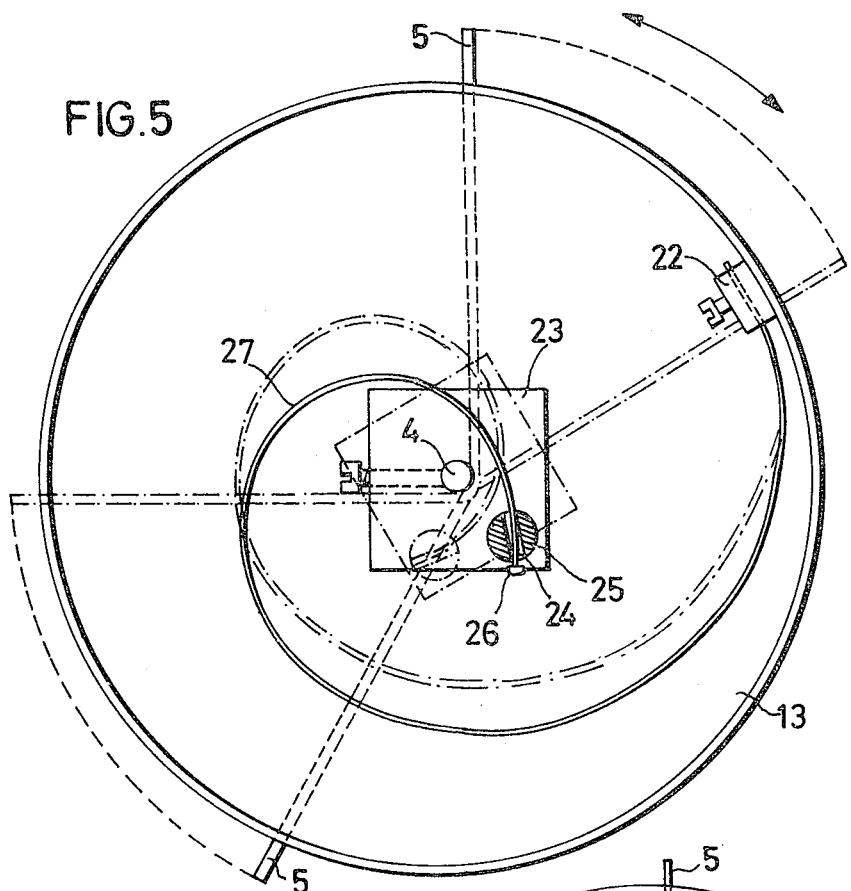
FIG. 5 illustrates a variation of the spring element shown in FIG. 3.

As already mentioned, the geometry of the flap, whose angled front portion has a very gentle opening and closing characteristic, whilst the rear portion opens or closes at the same angle of rotation substantially greater line cross-sections, leads to a very stable flow which is controlled for the most part by the flap in nozzle-like manner towards one pipe wall. The dispensing, made possible thereby, with movement-damping elements and a sound-proof housing is a considerable advantage not only on account of the space requirement which is disturbing because it exceeds the normal pipeline cross-section, but also on account of the considerable structural savings. The new flow regulator can be built extraordinarily simply and lightly as compared with the previous one with all its functional advantages. In certain details this also acts in turn in a conducive manner on the functional properties: Above all, there arises from the small diameter of the shaft in the single bearing bores of the housing bores only a very slight bearing friction which is an advantage for the sensitivity of regulation.

Where flow noise, carried in the ducting by excess speed is to be reckoned with, a sound absorber can be subsequently connected in the usual manner. In the case of the exemplified embodiment in accordance with FIG. 5, instead of the lever 18 with the shoulder 19 and the bore 20, a block 23 is provided on which a bolt 25 having a comparatively wide horizontal bore 24 is seated. It seizes with its bore the inner end, secured by a thickening 26 against slipping out, of a spiral spring 27.

The position of the block 23 with the bolt 25, and the disposition of the spring 27 are indicated in solid lines for the open position of the flap 5 and in dot-dash lines for the closed position. If the flap 5 is deflected out of the open position, then the bolt 25 moves with the spring end to the left in accordance with FIG. 5. The spring is deflected in this connection first of all only substantially in leaf spring manner, and the bolt 25 rotates with its wide bore 24 in the clockwise direction in relation to the spring end. Only when this rotation has led from the one possible extreme position, which is occupied at the beginning, to the other possible extreme position of the bore 24 in relation to the spring wire is the spring 27 deflected completely spirally and consequently stressed in the manner of a spiral spring, whereby a fairly sharp rise of the characteristic curve sets in.

Figure 6:
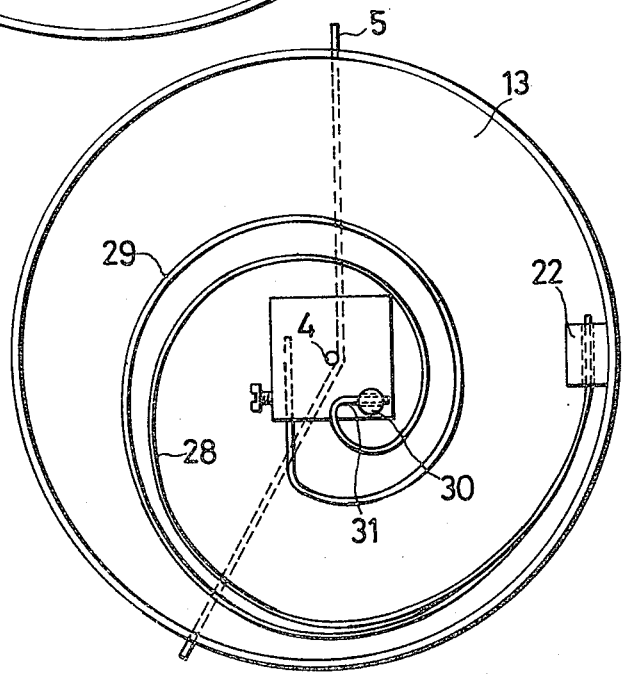
FIG. 6 illustrates a further type of the spring element.

Finally, the exemplified embodiment in accordance with FIG. 6 has, instead of the spiral spring 21 or 27, two spiral springs 28 and 29, of which the spiral spring 28 is held in a bolt 30, which corresponds approximately to the bolt 25, and the weaker spiral spring 29 is screwed securely in the block.

As is evident, upon rotation of the block in the clockwise direction, first of all only the spiral spring 29 comes into action. The bolt 30 is displaced in this connection on the bent-over end 31 of the spiral spring 28 and is rotated in relation to this latter until it finally entrains the spring 28 into its movement. In the case of such a construction having two spiral springs, it would also be possible to fasten one or both springs in the extension of the axis 4.

I claim:

1. In an air ducting section, a flow regulator comprising a flap for varying the free ducting cross-section, a shaft mounted transversely in the ducting section spaced from the central axis thereof by 1 to 4% of the ducting diameter, said flap being mounted on said shaft for rotation about the shaft axis to vary the free ducting cross-section, said flap comprising first and second portions obtusely angled relative to each other along a straight axial bend line closely adjacent and parallel to said shaft such that the two portions stand at an angle of 135° to 160° in relation to one another, said ducting section having an air inlet end and an air outlet end defining the direction of air flow therethrough, means defining an open position and a closed position for said flap, said first and second portions being angled relative to each other such that in the open position of said flap the first portion is directed downstream from said shaft generally parallel to the direction of air flow and the second portion is directed obliquely upstream, and in the closed position said second portion is directed substantially perpendicular to the ducting axis and said first portion is directed obliquely downstream, whereby air flow against said second portion biases said flap toward the closed position, and spring means continuously biasing said flap toward the open position.

2. A flow regulator as claimed in claim 1 wherein the shaft is arranged at the bend line defining said first and second portions of the flap.

3. A flow regulator as claimed in claim 1, wherein the open position of the flap is determined by a stop bolt for one of the flap portions.

4. A flow regulator as claimed in claim 1, wherein said spring means is located outside said ducting and comprises a spring element which has, in different angular position ranges of the shaft different kinds of stressing which, in the case of greater angular rotation, increase the spring force in a non-linear manner.

5. A flow regulator as claimed in claim 4, wherein the spring element consists of two individual spiral springs, of which one is fastened in such a way that it is stressed only after a specific angular rotation of the shaft.

6. A flow regulator as claimed in claim 1 wherein the two portions of the flap are oriented at an angle of 145° to 155° relative to each other.

7. A flow regulator as claimed in claim 1, wherein said ducting is of circular cross-section.

8. In an air ducting section, a flow regulator comprising a flap for varying the free ducting cross-section, a shaft mounted transversely in the ducting section near, but spaced from the central axis thereof, said flap being mounted on said shaft for rotation about the shaft axis to vary the free ducting cross-section, said flap comprising first and second portions obtusely angled relative to each other along a straight axial bend line closely adjacent and parallel to said shaft such hat two portions stand at an angle 135° to 160 ° in relation to one another, said ducting section having an air inlet end and an air outlet end defining the direction of air flow therethrough, means defining an open position and a closed position for said flap, said first and second portions being angled relative to each other such that in the open position of said flap the first portion is directed downstream from said shaft generally parallel to the direction air flow and the second portion is directed obliquely upstream, and in the closed position said second portion is directed substantially perpendicular to the ducting axis and said first portion is directed obliquely downstream, whereby air flow against said second portion biases said flap toward the closed position, and spring means continuously biasing said flap toward the open position, the flap being balanced in relation to the shaft by counterweight such that the center of gravity of the flap lies in said shaft axis.

9. A flow regulator as claimed in claim 8, wherein the counterweights penetrate the flap with an extension which embraces the shaft and has a screw which clamps the shaft and the flap together on the counter-weights.

10. In an air ducting section, a flow regulator comprising a flap for varying the free ducting cross-section, a shaft mounted transversely in the ducting section near the central axis thereof, said flap being mounted on said shaft for rotation about the shaft axis to vary the free ducting cross-section, said flap comprising first and second portions obtusely angled relative to each other along a bend line near said shaft, said ducting section having an air inlet end and an air outlet end defining the direction of air flow therethrough, means defining an open position and a closed position for said flap, said first and second portions being angled relative to each other such that in the open position of said flap the first portion is directed downstream from said shaft generally parallel to the direction of air fow and the second portion is directed obliquely upstream, and in the closed position said second portion is directed substantially perpendicular to the ducting axis and said first portion is directed obliquely downstream, whereby air flow against said second portion biases said flap toward the closed position, and spring means continuously biasing said flap toward the open position, said spring means being located outside said ducting and comprising a spring element which has, in different angular position ranges of the shaft different kinds of stressing which, in the case of greater angular rotation, increase the spring force in a non-linear manner, said spring element comprising two individual spiral springs, of which one is fastened in such a way that it is stressed only after a specific angular rotation of the shaft, said one spring being seated on the side of the shaft in a holder which allows a limited free angular rotation of the spring in relation to the shaft.

11. In an air ducting section, a flow regulator comprising a flap for varying the free ducting cross-section, a shaft mounted transversely in the ducting section near the central axis thereof, said flap being mounted on said shaft for rotation about the shaft axis to vary the free ducting cross-section, said flap comprising first and second portions obtusely angled relative to each other along a bend line near said shaft, said ducting section having an air inlet end and an air outlet end defining the direction of air flow therethrough, means defining an open position and a closed position for said flap, said first and second portions being angled relative to each other such that in the open position of said flap the first portion is directed downstream from said shaft generally parallel to the direction of air flow and the second portion is directed obliquely upstream, and in the closed position said second portion is directed substantially perpendicular to the ducting axis and said first portion is directed obliquely downstream, whereby air flow against said second portion biases said flap toward the closed position, and spring means continuously biasing said flap toward the open position, said spring means being located outside said ducting and comprising a spring element which has, in different angular position ranges of the shaft different kinds of stressing which, in the case of greater angular rotation, increase the spring force in a non-linear manner, said spring element comprising a spiral spring seated at its inner end on a lever, which is seated on the shaft, said inner end being seated with slight prestressing in a holder which allows a limited free angular rotation of said inner end in relation to the lever.

12. A flow regulator as claimed in claim 11, wherein the inner spring end is seated with a bend or break rotatably in a bore, parallel to the shaft, in the lever, and the lever has a shoulder located such that this latter butts, upon a predetermined angular rotation of the flap, against the spring inner end and the inner spring end is thus gripped for further angular rotation.

13. A flow regulator as claimed in claim 11, wherein the lever is formed by a block which is seated on the shaft, having a bolt which is fastened thereto and which has a transverse bore, receiving the spring end, of substantially greater diameter than the spring wire diameter.

14. A flow regulator as claimed in claim 11, wherein the outer spring end is fastened to a self-locking disc which is rotatable about the shaft of the flap.

15. A flow regulator as claimed in claim 14, wherein said disc forms a wall of a flat capsule which encloses the whole spring element.

* * * * *